T. Howell,
Hand Seeder.

No. 113,887. Patented Apr. 18, 1871.

Witnesses:
Jas. G. Hutchinson
C. L. Evert

Inventor.
Thomas Howell,
per
Alexander Mason
Attys.

United States Patent Office.

THOMAS HOWELL, OF MORGANTOWN, WEST VIRGINIA.

Letters Patent No. 113,887, dated April 18, 1871.

IMPROVEMENT IN HAND SEED-SOWERS.

The Schedule referred to in these Letters Patent and making part of the same.

*To all whom it may concern:*

Be it known that I, THOMAS HOWELL, of Morgantown, in the county of Monongahela and in the State of West Virginia, have invented certain new and useful Improvements in Hand Seed-Sowers; and do hereby declare that the following is a full, clear, and exact description thereof, reference being had to the accompanying drawing and to the letters of reference marked thereon making a part of this specification.

The nature of my invention consists in the construction and arrangement of a "hand seed-sower," as will be hereinafter more fully set forth.

In order to enable others skilled in the art to which my invention appertains to make and use the same, I will now proceed to describe its construction and operation, referring to the annexed drawing, in which—

Figure 1:
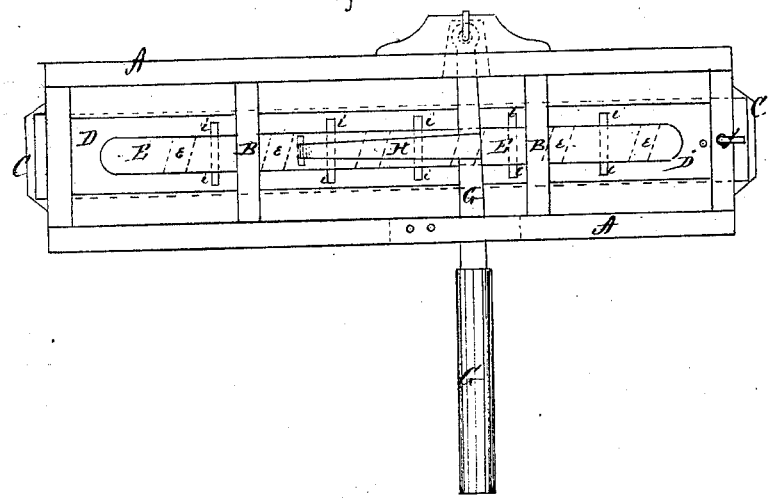

Figure 1 is a plan view, and

Figure 2:
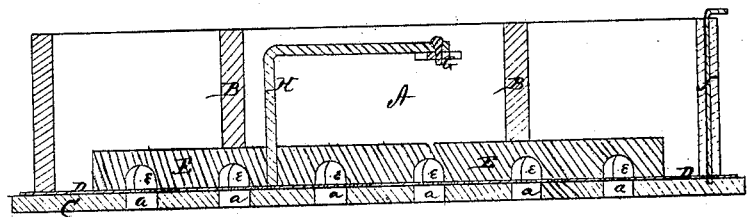

Figure 2 a longitudinal vertical section of my seed-sower.

Figure 3:
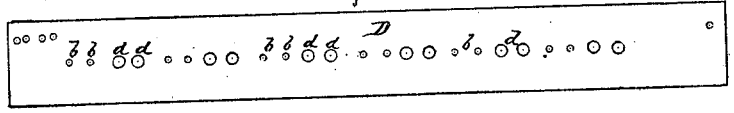

Figure 3 is a plan view of a slide used in the same.

A represents a box, of any suitable construction, having any desired number of transverse partitions B B and a wood bottom, C, with a series of holes, *a a*, with equal spaces between them.

Immediately over and resting on the bottom C is a perforated slide, D.

All the perforations in this slide are in a straight line, and arranged in groups, as shown in fig. 3, each group consisting of two small holes, *b b*, and two larger ones, *d d*.

There may, of course, be two or more of each kind in each group, as may be desired—the small holes to be used for small seed, and the large ones for large seed; and one or more of its kind to be brought over the holes *a* in the wood bottom C, to increase or diminish the feed as the operator may desire.

This slide D is held by means of a pin, *f*, passing through the end piece of the box A, and into holes made in the slide for that purpose, so that the slide may easily be adjusted for the work desired to be done.

E represents a rod resting upon the slide D, and moving endwise in the box, said box being provided on its under side with holes or notches *e e*, set on an angle for the purpose of dislodging the chaff and litter that gathers in the notch and over the holes in the slide.

One side of this rod will shift the seed to the right while the other side will shift the seed to the left, one in proportion to the other keeping up an agitation in the seed and forcing the chaff to the top.

On each side of the rod E, between the notches *e e*, project pins *i i*, as shown in fig. 1.

In sowing pulverized guano it will become packed in round balls alongside of the rods. These pins rub and mash up the balls.

The lever G is made of iron and put through a mortise in the box and pivoted at the front side thereof, as shown.

The L-shaped dog which connects said lever with the rod E is made movable, so as to be readily taken off for loading on a wagon, if desired.

Having thus fully described my invention,

What I claim as new, and desire to secure by Letters Patent, is—

1. The box A, constructed with partitions B B, wooden bottom C, with openings *a a*, as described, combined with the slide D having holes *b d*, and pin *f*, all substantially as and for the purposes set forth.

2. The combination of the box A, bottom C, slide D, rod E with notches *e e*, and pins *i i*, the lever G, and dog H, all substantially as and for the purposes herein set forth.

In testimony that I claim the foregoing I have hereunto set my hand this 4th day of February, 1871.

THOMAS HOWELL.

Witnesses:
RUSH DORSEY,
BEYAM M. DORSEY.